United States Patent [19]
Matsuda et al.

[11] 4,166,679
[45] Sep. 4, 1979

[54] EXPOSURE INFORMATION SETTING CIRCUIT

[75] Inventors: Motonobu Matsuda, Izumi; Masayoshi Sahara, Sennan; Tokuji Ishida, Daito, all of Japan

[73] Assignee: Minolta Camera Kabushiki Kaisha, Osaka, Japan

[21] Appl. No.: 809,472

[22] Filed: Jun. 23, 1977

[30] Foreign Application Priority Data

Jun. 24, 1976 [JP] Japan ................................. 51-75039

[51] Int. Cl.² .............................................. G03B 7/00
[52] U.S. Cl. .................................... 354/60 R; 354/24; 354/51; 354/289
[58] Field of Search ................... 354/24, 50, 51, 60 R, 354/60 E, 60 L, 289

[56] References Cited
U.S. PATENT DOCUMENTS 3,961,341  6/1976  Numata et al. .................... 354/60 L
3,971,045  7/1976  Nanba et al. ...................... 354/60 R Primary Examiner—Russell E. Adams
Attorney, Agent, or Firm—Wenderoth, Lind & Ponack

[57] ABSTRACT

The present invention is an exposure information setting circuit for use in photographic cameras which calculates the required exposure time in response to input signals indicative of APEX indices and produces a signal indicative of the exposure time. The circuit is constituted mainly by an integrated circuit which takes advantage of the fact that although the absolute values of electrical characteristics of the circuit elements may fluctuate, particular ratios of such values can be maintained in a predetermined ratio with good precision. This maintenance of the particular ratios can be achieved without requiring any supplementary voltage sources or/and adjustment resistors, whereby large-scale production of the exposure information setting circuit at low cost is possible.

14 Claims, 9 Drawing Figures

EXPOSURE INFORMATION SETTING CIRCUIT

BACKGROUND OF THE INVENTION

The present invention relates to a circuit for use in photographic cameras, and more particularly, to an exposure information setting circuit which produces a signal indicative of shutter speed upon receipt of signal indicative of the brightness of the object to be photographed.

In photography it is necessary to set the camera at the proper shutter speed and F number or aperture setting with respect to a preselected ASA or DIN number. These three factors, i.e., shutter speed, F number and ASA number are determined by the brightness of the object to be photographed. Since each factor is variable, it is photographer's choice to set these three factors to his taste. If, however, two of the factors are fixed, the remaining factor will be determined by the brightness of the object. In an automatic exposure control system for use in single-lens reflex camera employing through the lens (TTL) system, there have been employed an exposure information setting circuits which operate to calculate a suitable exposure time Tv in accordance with the so-called APEX system given by the following equation.

$$Tv = Bv - (Av - Sv) = Bv + Sv - Av \tag{1}$$

wherein Bv is the given value of objective brightness, i.e., the brightness of the scene to be photographed, Sv is the film sensitivity value and Av is the aperture value. These values Bv, Sv and Av are referred to as APEX indices hereinbelow.

In FIG. 1, there is shown an exposure information setting circuit which includes a photodiode $PD_2$ and diode $D_1$ connected in series across a first power source $E_1$. When the photodiode $PD_2$ receives light from the object to be photographed, a voltage signal $V_B$ which is related to the exponential value of the brightness is produced across the diode $D_1$. Here, the voltage signal $V_B$ is identical with the APEX index Bv of brightness value given in the equation (1). The principle circuit further includes potentiometers $PM_3$ and $PM_4$ which are parallel to one another and are connected to a second power source $E_2$. A sliding arm or wiper $W_3$ of the potentiometer $PM_3$ slides along the potentiometer to be set in a position corresponding to film sensitivity and is connected to junction $P_2$ between photodiode $PD_2$ and diode $D_1$. A wiper $W_4$ of the potentiometer $PM_4$ slides along the potentiometer to be set in a position corresponding to aperture value and is connected to an output terminal $P_4$. In this circuit the voltage drop $V_S$ between the wiper $W_3$ and a junction $P_3$ of potentiometers $PM_3$ and $PM_4$ is identical with the APEX index Sv of film sensitivity value and the voltage drop $V_A$ between the wiper $W_4$, and the junction $P_3$ is identical with the APEX index Av of aperture value.

According to the circuit described above, the voltage $V_T$ which appears across ground line $P_1$ and output terminal $P_4$ can be given as;

$$V_T = V_B + V_S - V_A \tag{2}$$

In other words, the circuit performs a calculation corresponding to the solution of the above described equation (1) showing APEX system.

Identical results can be obtained in the case where the output $P_4$ of the circuit shown in FIG. 1 is taken in reference to a junction $P_3'$ of the negative terminal of the power source $E_2$ and potentiometers $PM_3$ and $PM_4$. In this case, the voltage drop $V_S'$ between the wiper $W_3$ and the junction $P_3'$ corresponds to the APEX index Sv of film sensitivity value, while the voltage drop $V_A'$ between the wiper $W_4$ and the junction $P_3'$ corresponds to the APEX index Av of aperture value, thus, the output $V_T$ of the circuit can be given as;

$$V_T = V_B - V_S' + V_A' \tag{3}$$

The circuit of FIG. 1 employs two power sources $E_1$ and $E_2$. However, it is undesirable for the camera to have power sources occupy much space in the limited space available in the camera. Accordingly, there has been proposed a circuit which has the same function as that described above while employing only one power source. One example of such a circuit is shown in FIG. 2 in which the input voltage $V_B$ produced across the diode $D_1$ is supplied to a noninverting input of an operational amplifier $A_1$. The output terminal of the operational amplifier $A_1$ is connected to one junction $P_7$ of potentiometers $PM_5$ and $PM_6$ which are connected in parallel with each other. The other junction $P_8$ of the potentiometers $PM_5$ and $PM_6$ is connected to ground through series connection of a transistor $Q_{12}$ and an adjusting resistor $R_{11}$. The transistor $Q_{12}$ has its collector connected to the junction $P_8$ and its emitter connected to the adjusting resistor $R_{11}$. The base of the transistor $Q_{12}$ is connected to a transistor $Q_{11}$ at its collector. The transistor $Q_{11}$ has its base and emitter connected to each other to function as a diode, has the emitter connected to ground and has the collector connected to the positive side of a power source such as $E_1$ through a suitable resistor $R_{10}$. These transistors $Q_{11}$ and $Q_{12}$ and adjusting resistor $R_{11}$ are connected to form a known type of constant current generator. The wiper $W_5$ of the potentiometer $PM_5$, provided for establishing voltage signal $V_S$ indicative of the APEX index Sv of film sensitivity value, is connected to the inverting input of the operational amplifier $A_1$ to form a negative feedback circuit, so that the voltage drop appearing between the input terminals $P_5$ and $P_6$ is approximately maintained at 0 (volt). Accordingly, the signal appearing at the wiper $W_5$ is approximately equal to the signal appearing at the noninverting input $P_5$, that is, the signal $V_B$. The wiper $W_6$ of the potentiometer $PM_6$, provided for establishing voltage signal $V_A$ indicative of the APEX index Av of aperture value, is connected to an output terminal $P_9$. As a result, the voltage between the ground and the output terminal $P_9$ is $(V_B + V_S - V_A)$ which is equal to the above mentioned value of output $V_T$ indicative of exposure time. Thus, by the employment of the operational amplifier $A_1$ and transistors $Q_{11}$ and $Q_{12}$, the circuit of FIG. 2 permits calculation of exposure time without requiring a supplementary power source, such as power source $E_2$. Further information for this type of circuit shown in FIG. 2 is described in detail in U.S. Pat. No. 2,936,842 of Nanba et al or U.S. Pat. No. 3,977,011 of Matsuda.

However, according to this type of circuit as described above, it is inevitable to provide the adjusting resistor $R_{11}$ for the reasons described hereinbelow.

In an operational circuit such as shown in FIG. 2 or the circuit of FIG. 1, presuming an ambient temperature of 25° C., the value of the voltage change which corresponds to a 1-step change of the APEX index value is required to be 18 mv. This value is determined in reference to the current-voltage characteristics of the semiconductor employed as a logarithmic conversion element. In a diode, for example, a two-fold change in current therethrough normally corresponds to a change of 18 mv across the terminals thereof, and in a transistor a two-fold change in collector current corresponds to an 18 mv change in base-emitter voltage. Thus, in FIG. 1, when there is a two-fold change in the amount of light incident on photodiode $PD_2$, i.e., when there is a 1-step change of APEX index value, there is a two-fold change in photocurrent, and hence an 18 mv change in voltage $V_B$ across the terminals of diode $D_1$. The potentiometer circuit in the right-hand portion of FIG. 1 or FIG. 2 is required to accurately respond to input signals and accurately produce output signals that change 18 mv for each 1-step change in APEX value.

These requirements can be met in closely controlled manufacturing conditions. However, at present, such requirements can not be met in large-scale production. In other words, if it were possible to easily obtain, in large quantity, transistors $Q_{11}$ or $Q_{12}$ in which the requisite value of collector current could be obtained without need of adjustment, or if it were possible to easily obtain potentiometers having required resistance characteristic curves, there would be no problems. In large-scale production ensuring accuracy of values of circuit components beyond a certain point is considered too costly, and it is a current practice to tolerate a variation of 20% above or below the designed values of the characteristics of components. In the circuit of FIG. 2, therefore, in order to accurately obtain a signal voltage of 18 mv corresponding to a 1-step change in exposure time information, it is necessary to adjust the current which flows in potentiometers $PM_5$ and $PM_6$. To achieve this, it is necessary to add adjusting resistor $R_{11}$ to the exposure control circuit, which for the most part is constituted as an integrated circuit module. Because of this necessary addition of an extra resistor there is the disadvantage that extra work for positioning wiring, and adjustment is necessary, and hence the cost of production of the exposure control circuits is increased.

OBJECT OF THE INVENTION

It is an primary object of the present invention to provide an exposure information setting circuit which requires only one power source without requiring the use of supplementary adjusting resistors.

It is another object of the present invention to provide an exposure information setting circuit of the above described type which can be provided substantially in the form of an integrated circuit module.

SUMMARY OF THE INVENTION

In order to accomplish these and other objects, the present invention makes use of the fact that, although variations in conditions during large-scale production of integrated circuits make it practically impossible to guarantee maintenance of values of electrical characteristics of circuit elements within close tolerances in all circuits, it is possible to accurately maintain particular ratios between values of electrical characteristics of circuit elements in a whole series of circuits, since in any one circuit the absolute values of electrical characteristics of the circuit elements are all affected in more or less the same way by a variation in production conditions. In the circuit of the invention accurate production of requisite output signals depends merely on maintenance of ratios of characteristic values of circuit elements, and there is no need for costly control to achieve precise characteristic values, or for provision of supplementary adjustment means.

These and other object and features of the present invention will become apparent from the following descriptions taken in conjunction with preferred embodiments thereof with reference to the accompanying drawings, in which.

DETAILED DESCRIPTION OF THE INVENTION

Figure 1:
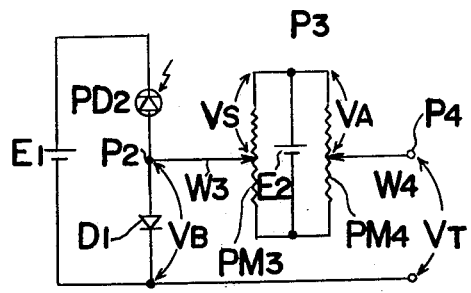
FIGS. 1 and 2 are drawings referred to in the foregoing description, FIG. 1 being a principle circuit for the exposure information setting circuit and FIG. 2 being one example of conventional type of exposure information setting circuit.

Before the description of the present invention proceeds, it should be noted that like parts are designated by like reference numerals throughout the accompanying drawings.

Figure 3:
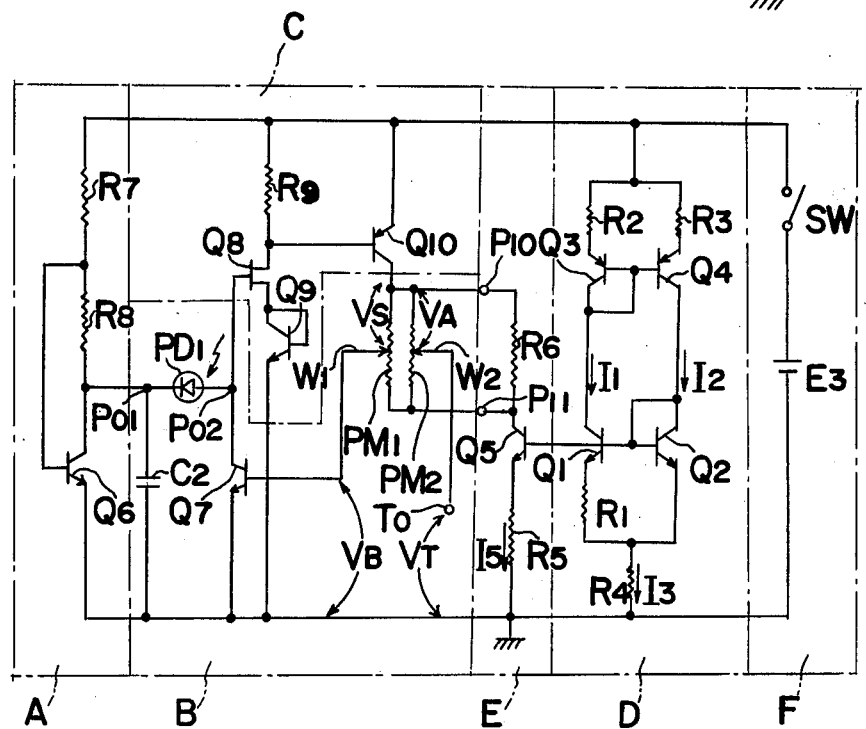
FIG. 3 is a circuit diagram of one embodiment of the present invention.

Referring to FIG. 3, the exposure information setting circuit of the present invention comprises a voltage setting circuit A including resistors $R_7$ and $R_8$ and transistor $Q_6$ connected in series and coupled to a power source F including a battery $E_3$ and a switch SW connected in series. In the voltage setting circuit A, the transistor $Q_6$ has its collector connected to the resistor $R_8$ and its emitter connected the negative terminal of the battery $E_3$, which is grounded. The base of the transistor $Q_6$ is connected to the junction of resistors $R_7$ and $R_8$ so that the transistor $Q_6$ is excited to generate a constant voltage between the collector and emitter thereof.

Coupled to the voltage setting circuit A is an exposure information developing circuit B including a capacitor $C_2$. One end of capacitor $C_2$ is connected to the voltage setting circuit A at the junction of resistor $R_8$ and the transistor $Q_6$ via terminal $P_{01}$ and the other end is grounded. Connected to the terminal $P_{01}$ is the cathode of the photodiode $PD_1$, while the anode thereof is connected to the collector of a transistor $Q_7$ via terminal $P_{02}$. The emitter of the transistor $Q_7$ is connected to the ground and base thereof is connected to wiper $W_1$ of potentiometer $PM_1$. The potentiometer $PM_1$ is connected in parallel with another potentiometer $PM_2$ and also in parallel with resistor $R_6$ which is described later. The wiper $W_2$ of the potentiometer $PM_2$ is connected to the output terminal $T_o$ of the exposure information setting circuit.

Coupled to the exposure information developing circuit B is an amplifier C including a field effect transistor (referred to as FET hereinbelow) $Q_8$ having the gate thereof connected to the terminal $P_{02}$. The source of the FET $Q_8$ is connected to the positive side of the battery $E_3$ through a suitable resistor $R_9$ and the drain of the FET $Q_8$ is connected, through a transistor $Q_9$ serving as a diode, to the ground. The source of the FET $Q_8$ is also connected to the base of transistor $Q_{10}$. The emitter of transistor $Q_{10}$ is connected to the positive side of the battery $E_3$ and the collector of transistor $Q_{10}$ is connected to the positive side of the potentiometer $PM_1$.

When the switch SW is closed, voltage at the terminal $P_{01}$ rises in accordance with the characteristic curve determined essentially by the time constant of capacitor $C_2$ and resistors $R_7$ and $R_8$. As a result of the rise in voltage at the terminal $P_{01}$ and the incidence of light on photodiode $PD_1$, the voltage at the terminal $P_{02}$ similarly rises. When the voltage at the terminal $P_{02}$ reaches a predetermined level suitable for stable circuit operation, the charge stored by the photodiode $PD_1$ acting as a capacitor is rapidly discharged through transistor $Q_7$. Note that when stable circuit operation conditions are reached, the voltage level at the terminal $P_{01}$ is set to be generally equal to or slightly greater than that at the terminal $P_{02}$. In this manner, photocurrent proportional to the brightness of light incident on photodiode $PD_1$ is obtained. Also note that the capacitor $C_2$ is provided for reducing the time the circuit is in the transient state and for rapidly achieving the stable circuit operation conditions when the power is first supplied, upon turning on of switch SW. More specifically, by the provision of the time constant circuit consisting essentially of capacitor $C_2$ and the resistors $R_7$ and $R_8$, stable circuit operation conditions are achieved about 10 msec after closure of the power source circuit E. Without provision of capacitor $C_2$, it would take several seconds to achieve circuit stablity.

In the event that the incident light should increase to rise the gate voltage of the FET $Q_8$, the voltage at the drain thereof decreases, and in turn, the voltage at the collector of the transistor $Q_{10}$ increases. Since, as described later, a constant current flows in potentiometer $PM_1$, rise of collector voltage of transistor $Q_{10}$ is transmitted to the base of the transistor $Q_7$. Therefore, the collector voltage of the transistor $Q_7$ is decreased. Consequently, the gate voltage of the FET $Q_8$ is maintained at a predetermined value, regardless of fluctuation of gate voltage thereof, by a network of negative feedback circuit as described above formed in the amplifier C. In other words, the voltage drop across the photodiode $PD_1$ is maintained at a predetermined value in accordance with the changes in the amount of light incident on photodiode $PD_1$, so that good response of the photodiode is ensured.

The potentiometers $PM_1$ and $PM_2$ described as connected in parallel with each other, are in turn connected in parallel with the resistor $R_6$ through terminals $P_{10}$ and $P_{11}$. The wiper $W_1$ of the potentiometer $PM_1$ is previously adjusted to produce, between the wiper $W_1$ and the terminal $P_{10}$, a voltage signal $V_S$ indicative of the film sensitivity value while the wiper $W_2$ of the potentiometer $PM_2$ is previously adjusted to produce, between the wiper $W_2$ and the terminal $P_{10}$, a voltage signal $V_A$ indicative of the aperture value. Since the wiper $W_1$ is connected to the base of the transistor $Q_7$ producing a voltage signal $V_B$ indicative of the brightness, the output terminal To produces the exposure information signal $V_T$.

Still referring to FIG. 3, the description is now directed to a constant current generator D. The constant current generator D comprises transistors $Q_1$, $Q_2$, $Q_3$ and $Q_4$ and resistors $R_1$, $R_2$, $R_3$ and $R_4$. The transistors $Q_1$ and $Q_2$ have their bases connected to each other and their emitters connected to each other through the resistor $R_1$. The emitter of the transistor $Q_2$ is further connected to ground through the resistor $R_4$. On the other hand, the transistors $Q_3$ and $Q_4$ have their bases connected to each other and their emitters connected to each other through the resistors $R_2$ and $R_3$ connected in series. The junction between the resistors $R_2$ and $R_3$ is connected to the positive side of the battery $E_3$. The collectors of the transistors $Q_1$ and $Q_3$ are connected to each other and the collectors of the transistors $Q_2$ and $Q_4$ are also connected together. Furthermore, the transistor $Q_2$ has its base and collector connected together and the transistor $Q_3$ has its base and collector connected to each other. The constant current generator D as described above is coupled with a voltage setting circuit E in a manner described hereinbelow. The base of the transistor $Q_1$ is further connected to the base of transistor $Q_5$, namely output transistor $Q_5$. The emitter of output transistor $Q_5$ is connected to ground through resistor $R_5$ and the collector of transistor $Q_5$ is connected to resistor $R_6$.

It should also be noted that the electrical elements in the constant current generator D and the voltage setting circuit E, i.e., the transistors $Q_1$ to $Q_5$ and resistors $R_1$ to $R_5$ are provided as an integrated circuit on a semiconductor chip and that the transistors $Q_1$, $Q_2$ and $Q_5$ are NPN type transistors and transistors $Q_3$ and $Q_4$ are PNP type transistors. The value of resistance offered by the resistor $R_6$ is suitably smaller than, e.g., 1/10 to 1/5, that of the lumped resistance of potentiometers $PM_1$ and $PM_2$.

Generally, during the production of large numbers of semiconductor integrated circuits, the base-emitter voltage characteristics and the resistance values of resistors vary considerably from circuit to circuit depending on the diffusion conditions, etc. Therefore, it is difficult to precisely achieve the required values in every circuit. However, since the area of any element on an integrated circuit chip is determined by a mask, it is possible to maintain good precision in the specific ratios of resistances of resistors or of transistor emitter areas, etc. The invention makes use of this characteristic of integrated circuits to provide a circuit in which the voltage across particular resistors is held close to required values, and accurately varying output signals are produced despite the fact that the electrical values of circuit elements may vary from the design values which are considered ideal with respect to the resistance values of potentiometers $PM_1$ and $PM_2$.

In regard to the constant current generator D which is formed by a semiconductor integrated circuit, the emitter region areas of the transistors $Q_3$ and $Q_4$ are defined as respectively $S_3$ and $S_4$ and resistance values of the resistors $R_2$ and $R_3$ are defined as respectively $R_2$ and $R_3$. Unless the value of various electrical elements such as resistors and capacitors is defined as represented by particular characters, the values of respective elements are represented by the respective reference characters hereinbelow. In the step of forming the semiconductor integrated circuit, the transistors $Q_3$ and $Q_4$ and the resistors $R_2$ and $R_3$ are designed to satisfy the relation given by the following equation.

$$S_3/S_4 = R_3/R_2 \qquad (4)$$

This relation results in a voltage between the base and emitter of the transistor $Q_3$ equal to that of the transistor $Q_4$. The ratio of collector currents $I_1$ and $I_2$ of the transistors $Q_3$ and $Q_4$, respectively, is proportional to the ratio of areas in the emitter regions thereof. Accordingly, from the equation (4), the following equation is obtained.

$$I_1/I_2 = S_3/S_4 \qquad (5)$$

It should be noted that, in the constant current generator described above, the resistors $R_2$, $R_3$ and $R_4$ are not strictly necessary, but are merely provided to control the current flowing through the constant current generator. Generally, in a transistor where the base current is constant, the collector current varies in accordance with the change of collector-emitter voltage. For example, in the circuit of FIG. 3, if the voltage of the battery $E_3$ rises, the voltage between the collector and the base of transistor $Q_4$ will increase, thus increasing the collector current $I_2$ of transistor $Q_4$. At the same time, this increase in the collector current $I_2$ produces a voltage increase across the resistor $R_3$, and accordingly, the base-emitter voltage of the transistor $Q_4$ increases. As a result, because of this negative feedback effect, collector current $I_2$ is maintained at a constant value. In other words, the resistor $R_3$ is provided for establishing a self-biasing circuit while the resistor $R_2$ is provided for equalizing the base-emitter voltage of the transistor $Q_3$ with that of the transistor $Q_4$. The resistor $R_4$ is also basically unnecessary, but is provided to prevent excessive rise of the base voltage of transistors $Q_1$ and $Q_2$.

Considering now particularly the transistors $Q_1$ and $Q_2$, since the bases of the transistors $Q_1$ and $Q_2$ are connected to each other, the relation among the transistors $Q_1$ and $Q_2$ and the resistor $R_1$ can be represented as follows;

$$V_{BE1} + I_1 R_1 = V_{BE2} \qquad (6)$$

wherein $V_{BE1}$ and $V_{BE2}$ are base-emitter voltage of the transistors $Q_1$ and $Q_2$ respectively. According to the characteristics of the transistor, these voltages $V_{BE1}$ and $V_{BE2}$ can be expressed by the following equations;

$$V_{BE1} = \frac{KT}{q} \cdot \ln \frac{I_1}{I_{S1}} \qquad (7)$$

$$V_{BE2} = \frac{KT}{q} \cdot \ln \frac{I_2}{I_{S2}} \qquad (8)$$

wherein K is Boltzmann's constant, T is absolute temperature, q is electron charge and $I_{S1}$ and $I_{S2}$ are respectively the reverse saturation currents of the transistors $Q_1$ and $Q_2$. By applying the equations (7) and (8) to the equation (6), the following equation is obtained;

$$\frac{KT}{q} \cdot \ln \frac{I_1}{I_{S1}} + I_1 R_1 = \frac{KT}{q} \cdot \ln \frac{I_2}{I_{S2}} \qquad (9)$$

The equation (9) can be further modified to obtain the following equation;

$$V_{R1} = \frac{KT}{q} \cdot \ln \left( \frac{I_2}{I_1} \cdot \frac{I_{S1}}{I_{S2}} \right) \qquad (10)$$

wherein $V_{R1}$ is equal to $I_1 \cdot R_1$. Since the reverse saturation currents $I_{S1}$ and $I_{S2}$ are proportional to the respective emitter region areas $S_1$ and $S_2$ of transistors $Q_1$ and $Q_2$, and the collector currents $I_1$ and $I_2$ are proportional to the respective emitter region areas $S_3$ and $S_4$ of the transistors $Q_3$ and $Q_4$ from the equation (5), the equation (10) can be further modified to obtain the following equation;

$$V_{R1} = \frac{KT}{q} \cdot \ln \left( \frac{S_1}{S_2} \cdot \frac{S_4}{S_3} \right) \qquad (11)$$

As is apparent from the equation (11), the voltage appearing across the resistor $R_1$ is determined by the ratios of the emitter region areas of transistors $Q_1$, $Q_2$, $Q_3$ and $Q_4$. Also, since $V_{R1} = I_1 R_1$, the values of the currents $I_2$ and $I_1$ are determined by the resistance value presented by the resistor $R_1$. From the relation $V_{R1} = I_1 R_1$ and $I_1/I_2 = S_3/S_4$, the voltage $V_{R4}$ appearing across the resistor $R_4$ can be expressed as follows;

$$\begin{aligned} V_{R4} &= I_3 R_4 \\ &= (I_1 + I_2) \cdot R_4 \\ &= (I_1 + \frac{S_4}{S_3} \cdot I_1) \cdot R_4 \\ &= (1 + \frac{S_4}{S_3}) \cdot \frac{R_4}{R_1} \cdot V_{R1} \end{aligned} \qquad (12)$$

From the equation (12), it is understood that the voltage $V_{R4}$ is determined by the ratio of resistance value of $R_1$ and $R_4$.

The description hereinbelow is now particularly directed to the output transistor $Q_5$ and the resistor $R_5$ connected to the emitter thereof.

According to the characteristics of the transistor, the relation between the collector current $I_5$, which is approximately equal to the emitter current, of the transistor $Q_5$ and the base-emitter voltage $V_{BE5}$ of the transistor $Q_5$ can be expressed in the following equations;

$$V_{BE5} = KT/q \cdot \ln I_5/I_{S5} \qquad (13)$$

wherein $I_{S5}$ is a reverse saturation current of the transistor $Q_5$. Since the base of the transistor $Q_5$ is in common with the base of the transistor $Q_2$, following equation is obtained;

$$V_{BE5} + I_5 R_5 = V_{BE2} + I_3 R_4 \qquad (14)$$

By applying equations (8) and (13) to the equation (14), following equation is obtained;

$$V_{R5} = \frac{KT}{q} \cdot \ln \left( \frac{I_2}{I_5} \cdot \frac{I_{S5}}{I_{S2}} \right) + V_{R4} \qquad (15)$$

wherein $V_{R5} = I_5 R_5$ and $V_{R4} = I_3 R_4$. Since the reverse saturation currents $I_{S5}$ and $I_{S2}$ are proportional to the respective emitter region areas $S_5$ and $S_2$ of the transistors $Q_5$ and $Q_2$, it is understood from equation (15) that the voltage $V_{R5}$ across the resistor $R_5$ is determined once the ratios of emitter region areas and collector currents of transistor $Q_5$ to those of transistor $Q_2$ are specified.

By way of example, consider the case in which the dimensions of the output transistor $Q_5$ are made equal to those of the transistor $Q_2$ and the collector current $I_5$ is made equal to the collector current $I_2$. In this case, if the voltage $V_{R5}$ across the resistor $R_5$ is set to be equal to the voltage $V_{R4}$, in other words, if the relation;

$$I_2 R_5 = I_3 R_4 \qquad (16)$$

is satisfied, then the respective base-emitter voltages $V_{BE5}$ and the $V_{BE2}$ of transistors $Q_5$ and $Q_2$ become equal, and collector currents $I_5$ and $I_2$ of these transistors also become equal. The equation (16) can be rearranged as in a following equation;

$$\frac{R_5}{R_4} = \frac{I_3}{I_2} \quad (17)$$
$$= \frac{I_1 + I_2}{I_2}$$
$$= \frac{S_3}{S_4} + 1$$

From the equation (17), it is understood that the ratio of resistance $R_5$ to that of $R_4$ required to satisfy equation (16) is determined solely by the ratio of emitter area of transistor $Q_3$ to that of the transistor $Q_4$. Therefore, since it is possible to design the resistor $R_5$ to satisfy ratio requirements of equation (17), it is possible to make the voltage $V_{R5}$ across the resistor $R_5$ equal to the voltage $V_{R4}$ across the resistor $R_4$, and it is also possible to make the collector current $I_5$ equal to the collector current $I_2$.

Next, the voltage $V_{R6}$ across the resistor $R_6$ connected to the collector of the transistor $Q_5$ is taken into consideration, provided that the presence of the potentiometers $PM_1$ and $PM_2$ of FIG. 3 is disregarded for the moment and that the collector current $I_5$ of the transistor $Q_5$ is assumed to be simply flowing through the resistor $R_6$, so as to simplify the description hereinbelow. When the collector currents $I_5$ and $I_2$ are made equal in the manner described above, voltage $V_{R6}$ can be expressed as follows;

$$V_{R6} = I_2 R_6 \quad (18)$$

Since $I_2 = S_4/S_3 \cdot V_{R1}/R_1$, the equation (18) can be expressed as follows;

$$V_{R6} = S_4/S_3 \cdot R_6/R_1 \cdot V_{R1} \quad (19)$$

Furthermore, since $V_{R1} = KT/q \cdot \ln S_1/S_2 \cdot S_4/S_3$, the equation (19) can be expressed as follows;

$$V_{R6} = \frac{S_4}{S_3} \cdot \frac{R_6}{R_1} \cdot \frac{KT}{q} \cdot \ln \left( \frac{S_1}{S_2} \cdot \frac{S_4}{S_3} \right) \quad (20)$$

As is apparent from the equation (20), the voltage $V_{R6}$ across the resistor $R_6$ is determined by the ratio of resistance $R_6$ to $R_1$, and it is understood that the voltage $V_{R6}$ is proportional to the absolute temperature T.

Now, consider the case in which the potentiometers $PM_1$ and $PM_2$ are connected in parallel with the resistor $R_6$ through the terminals $P_{10}$ and $P_{11}$, as shown in FIG. 3. Assume that the potentiometers $PM_1$ and $PM_2$ are each required to specify information in 10 steps. In this case, at 25° C., the voltage required to be produced across the terminals $P_{10}$ and $P_{11}$ is 18 mv×10=180 mv. Also, by way of example, note that the potentiometers $PM_1$ and $PM_2$ are designed to have a parallelly connected combined resistance value of 10 times the value of the resistor $R_6$. However, the actually achieved resistance in the integrated circuit obtained through known manufacturing steps has a variation, for example, in the range of ±30%, with respect to the designed value. Similarly, the potentiometers $PM_1$ and $PM_2$ have a certain degree of variation. The resistor $R_6$, in the instance shown in FIG. 3, has a variation of ±30% while the potentiometers $PM_1$ and $PM_2$ have variations of ±20%. When the potentiometers $PM_1$ and $PM_2$ are not connected to the terminals $P_{10}$ and $P_{11}$, the required voltage across the resistor $R_6$, that, is between the terminals $P_{10}$ and $P_{11}$ is 198 mv, since the resistance value of the parallel connection of potentiometers $PM_1$ and $PM_2$ and the resistor $R_6$ equals $R_6/1.1$, while $R_6/1.1 \times I_5 = 180$ mv, thus $R_6 \times I_5 = 198$ mv.

With resistor $R_6$ having a variation of ±30% and potentiometers $PM_1$ and $PM_2$ having a variation of ±20%, one of the worst cases in the combination occurs when the resistor $R_6$ is varied 30% above the designed value while the potentiometers are varied 20% below the designed value. Accordingly, the resistance value of the resistor $R_6$ can be represented as $1.3R_6$, while the resistance value of the parallelly connected potentiometers $PM_1$ and $PM_2$ can be represented as $8R_6$. In spite of this variation in the resistor $R_6$, the collector current of the transistor $Q_5$ is maintained at a predetermined value for the reasons described above. In the above described worst case, the voltage $V_{180}$ appearing between the terminals $P_{10}$ and $P_{11}$ is calculated as follows $$V_{180} = \frac{8R_6 \cdot 1.3R_6}{8R_6 + 1.3R_6} \times \frac{I_5}{1.3}$$
$$= \frac{8}{9.3} \times 198$$
$$= 170 \text{mv}$$

In other words, the value of voltage actually produced is 170 mv instead of the value of 180 mv supposed to be produced. As 18 mv corresponds to 1-step of potentiometer setting, this output voltage constitutes an error of (180−170)/18=0.56 of a step.

The situation in which this an error would result in any apparent effect in the output of the information setting circuit would be in the case where a low-speed film (e.g. ASA 6) is employed and the wiper $W_1$ is moved towards the upper terminal end $P_{10}$ of the potentiometer $PM_1$ while the camera shutter aperture is set at a minimum or close to a minimum value such as F32 and the wiper $W_2$ is moved to the lower terminal $P_{11}$ end of the potentiometer $PM_2$. However, deliberate selection of such a combination of settings occurs only in the work of a specialist and application of such a combination in an automatic exposure control circuit is not in fact employed. In normal practical photography, such settings do not occur, and even if they did the effect of a 0.56 step error would not be unduly great, when compared with the photographic effect achieved by properly selecting such a combination of settings. For other potentiometer settings, a 0.56 step error is well within accepted limits of precision. Thus, the exposure information setting circuit of the present invention provides a circuit which, although it can be manufactured on a mass-production basis, does not require provision of a supplementary adjustment means in order to accurately calculate exposure information, so that the work steps and requirements for skilled work are reduced and the cost of production is lowered accordingly.

However, in the case where it is desired to completely eliminate this error as described above, an adjusting variable resistor (not shown) can be inserted between the terminals $P_{10}$ and $P_{11}$, or between the lower end terminal of the potentiometer $PM_2$ and the terminal $P_{11}$ so as to adjust the voltage drop between the terminals $P_{10}$ and $P_{11}$ to substantially equal to a predetermined value, i.e., 180 mv.

Note that the base-emitter voltage $V_{BE7}$ of the transistor $Q_7$ corresponding to the brightness signal of the object is proportional to the absolute temperature, since $$V_{BE7} = KT/q \cdot \ln I_7/I_{S7} \tag{21}$$

wherein $I_7$ is a photocurrent and $I_{S7}$ is a reverse saturation current of the transistor $Q_7$. It is, therefore, necessary to have the voltage obtained from the potentiometers $PM_1$ and $PM_2$ proportional to the absolute temperature. However, as is apparent from the equation (20), the voltage across the resistor $R_6$ is proportional to the absolute temperature. Accordingly, in the case where the resistance value of the resistor $R_6$ is comparatively large with respect to the combined resistance value of the potentiometers $PM_1$ and $PM_2$, the voltage obtained between the terminals $P_{10}$ and $P_{11}$ will become substantially proportional to the absolute temperature when the resistor $R_6$ is connected in parallel to the potentiometers $PM_1$ and $PM_2$. Thus, there will be an accurate computation of signal indicative of the exposure time by the circuit as a whole.

Figure 4:
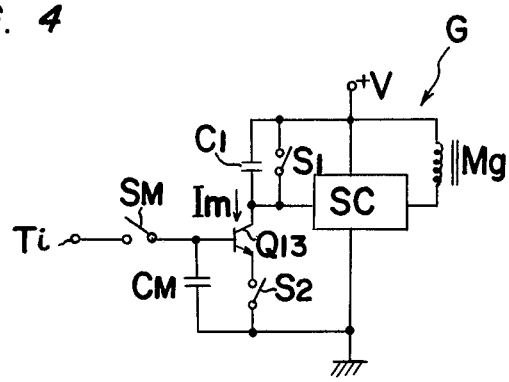
FIG. 4 is one embodiment of a shutter mechanism operation circuit to be coupled with the circuit of FIG. 3.

The output voltage signal $V_T$ indicative of the exposure time is supplied to a shutter mechanism operating circuit of any known type such as one shown in FIG. 4.

Referring to FIG. 4, the shutter mechanism operating circuit G comprises a memory switch Sm and a memory capacitor Cm connected in series. The switch Sm has one end connected to the input terminal Ti which is further connected to the output terminal To of the exposure information setting circuit and the other end thereof connected to the capacitor Cm which is in turn connected to the ground. Thus the capacitor Cm memorizes the value of the output voltage signal $V_T$ when the switch Sm is closed. This memorized signal, i.e., the signal $V_T$, is integrated in an intergration circuit comprising a switch $S_2$, a transistor $Q_{13}$ and a capacitor $C_1$ connected in series, and a switch $S_1$ connected in parallel with the capacitor $C_1$. The memorized signal $V_T$ is applied to the base of the transistor $Q_{13}$ for generating a current $I_m$ determined by the signal $V_T$ and this current $I_m$ charges the capacitor $C_2$. The charged voltage is applied to a holding circuit comprising a switching circuit SC and an electromagnet Mg connected in series. When the capacitor $C_2$ is suitably charged up to a predetermined level, the voltage across capacitor $C_1$ turns the switching circuit SC off, thus de-energizing the electromagnet Mg and automatically closing the window of the exposure system in the camera. It should be noted that the window is opened at the moment when the shutter of the camera is released.

The foregoing description is particularly directed to a case where the integrated circuit including constant current generator D and the voltage setting circuit E is formed to have the transistors $Q_2$ and $Q_5$ constructed with exactly the same features and arranged to produce the same collector currents $I_2$ and $I_5$. The description hereinbelow is given to the general case where the characteristics as well as the collector currents $I_2$ and $I_5$ of the transistors $Q_2$ and $Q_5$ are different from each other.

From the equation (15), the relation between the voltages $V_{R5}$ and $V_{R4}$ can be expressed as follows;

$$V_{R4} - V_{R5} = \frac{KT}{q} \cdot \ln \frac{I_5}{I_2} \cdot \frac{S_5}{S_2} \tag{22}$$

From the equation (22), the current $I_5$ is expressed as follows;

$$I_5 = \frac{S_5}{S_2} I_2 \cdot e^{(\frac{V_{R4} - V_{R5}}{KT}) \cdot q} \tag{23}$$

While, on the other hand, from the equation (5), $$I_2 = \frac{S_4}{S_3} \cdot \frac{V_{R1}}{R_1} \tag{24}$$

therefore $$I_5 = \frac{S_4}{S_3} \cdot \frac{S_5}{S_2} \cdot \frac{V_{R1}}{R_1} \cdot e^{(\frac{V_{R4} - V_{R5}}{KT}) \cdot q} \tag{25}$$

Furthermore, since $V_{R5} = I_5 R_5$, the equation (25) can be expressed as;

$$V_{R5} = \frac{S_4}{S_3} \cdot \frac{S_5}{S_2} \cdot \frac{R_5}{R_1} \cdot V_{R1} \cdot e^{(\frac{V_{R4} - V_{R5}}{KT}) \cdot q} \tag{26}$$

Accordingly, from the equation (26), it is possible to construct a desirable output transistor $Q_5$ and also a desirable resistor $R_5$.

In the similar manner, since $$V_{R6} = I_5 R_6,$$
$$V_{R6} = \frac{S_4}{S_3} \cdot \frac{S_5}{S_2} \cdot \frac{R_6}{R_1} \cdot V_{R1} \cdot e^{(\frac{V_{R4} - V_{R5}}{KT}) \cdot q} \tag{27}$$

From the equation (27), it is possible to construct a desirable resistor $R_6$ which produces a predetermined voltage $V_{R6}$ thereacross.

In the case where the resistance values $R_4$ and $V_{R6}$ are zero, the voltage $R_4$ is expressed as;

$$V_{R6} = \frac{S_4}{S_3} \cdot \frac{S_5}{S_2} \cdot \frac{R_6}{R_1} \cdot V_{R1} \tag{28}$$

Figure 5:
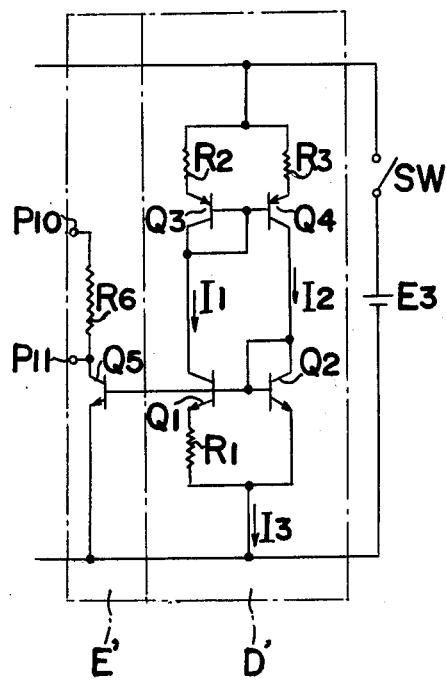
FIGS. 5, 6, 7 and 8 are circuit diagrams of various modifications of the portion of the circuit of FIG. 3 to be formed in an integrated circuit.

Referring to FIG. 5 there is shown a constant current generator D' and a voltage setting circuit E' which are modifications of the same shown in FIG. 3. In the circuit of FIG. 5, the resistors $R_4$ and $R_5$ are eliminated to show the resistance values thereacross are substantially zero.

Figure 6:
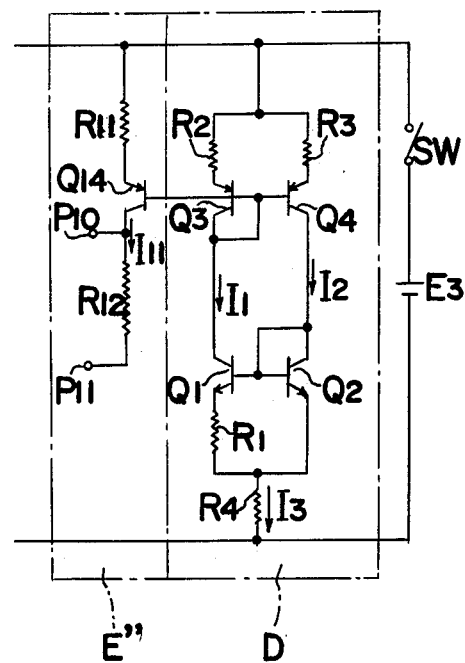

Referring to FIG. 6, there is shown a voltage setting circuit E'' which is another modification of the voltage setting circuit E. The voltage setting circuit E'' comprises an output transistor $Q_{14}$ having the base thereof connected to the base of the transistor $Q_3$. The emitter of transistor $Q_{14}$ connected to a resistor $R_{11}$ and further to a positive side of the battery $E_3$. The collector of the transistor $Q_{14}$ is connected to resistor $R_{12}$ which is connected, in parallel with the potentiometers $PM_1$ and $PM_2$ through a pair of terminals $P_{10}$ and $P_{11}$. It is to be noted that the transistor $Q_{14}$ and the resistors $R_{11}$ and $R_{12}$ in the voltage setting circuit E'' are formed in the integrated circuit together with the constant current generator D. The voltage setting circuit E'' in this modification shows that the output transistor employed therein is not necessarily biased by the base of the transistors $Q_1$ or $Q_2$, but it is possible to have the output transistor biased by the base of the transistors $Q_3$ and $Q_4$.

Figure 7:
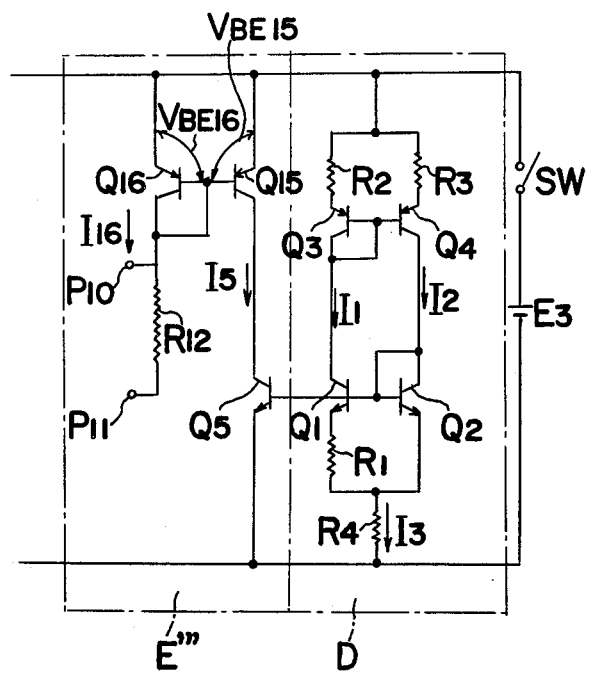

Referring to FIG. 7, there is shown a voltage setting circuit E''' which is yet another modification of the voltage setting circuit E shown in FIG. 3. The voltage setting circuit E''' comprises the transistor $Q_5$ having the base thereof connected to the base of the transistor $Q_1$, and a pair of transistors $Q_{15}$ and $Q_{16}$ having the bases thereof connected to each other. The transistor $Q_{15}$ has its collector connected to the collector of the transistor $Q_5$ and the emitter thereof connected to the emitter of the transistor $Q_{16}$ and further to the positive side of the battery $E_3$. The transistor $Q_{16}$, namely the output transistor, has its base and collector connected to each other. A resistor $R_{12}$ is connected to the collector of the transistor $Q_{16}$ and also connected in parallel with the potentiometers $PM_1$ and $PM_2$. Note that the transistors $Q_5$, $Q_{15}$ and $Q_{16}$ and the resistor $R_{12}$ in the voltage setting circuit E''' are formed in the integrated circuit together with the constant current generator D.

According to the voltage setting circuit E''' of FIG. 7, the base-emitter voltage $V_{BE5}$ of the transistor $Q_5$ is determined by the base-emitter voltage $V_{BE2}$ of the transistor $Q_2$. The current $I_5$ relating to the base-emitter voltage $V_{BE5}$ is thus determined, and in turn, the base-emitter voltage $V_{BE15}$ of the transistor $Q_{15}$ is determined by the current $I_5$. Similarly, the base-emitter voltage $V_{BE16}$ of the transistor $Q_{16}$ is determined by the base-emitter voltage $V_{BE15}$, so that the current $I_{16}$ relating to the base-emitter voltage $V_{BE16}$ is thus determined. Therefore, a predetermined voltage is produced across the resistor $R_{12}$. The voltage setting circuit E''' in this modification shows that the output transistor in the voltage setting circuit can be indirectly biased by the output of the constant current generator D.

Figure 8:
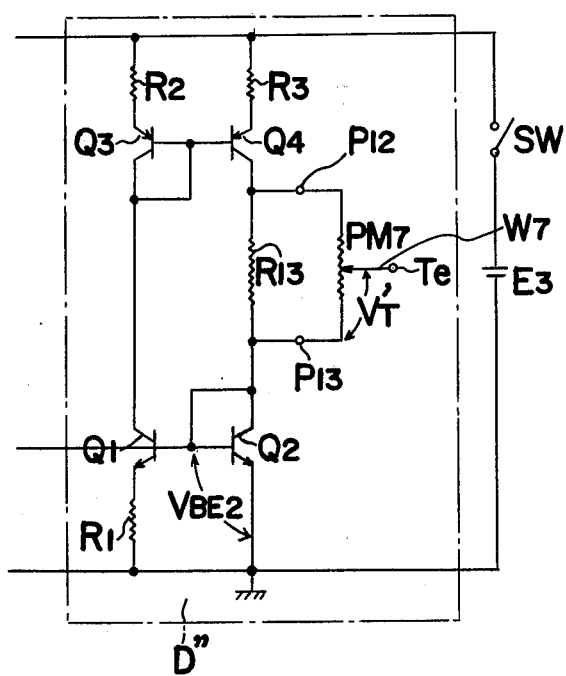

Referring to FIG. 8, there is shown a constant current generator D'' which is another modification of the constant current generator D shown in FIG. 3. The constant current generator D'' has a resistor $R_{13}$ connected between the collectors of the transistors $Q_2$ and $Q_4$. The opposite ends of the resistor $R_{13}$ are provided with terminals $P_{12}$ and $P_{13}$, respectively, for connecting a potentiometer $PM_7$ therebetween. Note that the resistor $R_{13}$ is formed in the integrated circuit together with the other electric elements in the current generator D'' such as transistors $Q_1$, $Q_2$, $Q_3$ and $Q_4$ and resistors $R_1$, $R_2$ and $R_3$, however, the potentiometer $PM_7$ is provided externally to the integrated circuit. Wiper $W_7$ of the potentiometer $PM_7$ is connected to the output terminal Te which is further connected to a circuit such as shown in FIG. 4. The wiper $W_7$ is mechanically coupled to a shutter speed setting dial provided in the camera so as to permit manual setting of the exposure time. In this circuit, the output signal produced from the wiper $W_7$ is equal to $V_{BE2}+Vt'$, in which $Vt'$ is a voltage drop between the wiper $W_7$ and the terminal $P_{13}$. Since the characteristics in the integrated circuit comprising transistors $Q_1$ to $Q_4$, and resistors $R_1$ to $R_3$ and $R_{13}$, can be controlled to generate a constant current across the resistor $R_{13}$, the required output voltage signal indicative of the exposure time can be accurately achieved regardless of departure of the electrical characteristics of potentiometer $PM_7$ from the design values.

Figure 9:
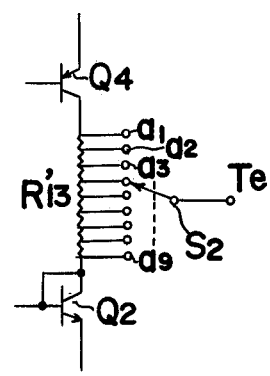
FIG. 9 is a modification of a potentiometer portion to be employed in the circuit of FIG. 8.

Referring to FIG. 9, there is shown a resistor $R_{13}'$ which is a modification of the resistor $R_{13}$ of FIG. 8. The resistor $R_{13}'$ in this modification is divided into a plurality of sections, ten sections in this instance, and is provided with taps $1a$ to $9a$ between the neighboring sections. These taps are selectively connected with the output terminal Te for producing the output voltage signal indicative of the exposure time. With the circuit shown in FIG. 9, it is necessary to provide the external potentiometer $PM_7$ as described above.

According to the exposure information setting circuit of the present invention, there is no need to provide any variable adjusting resistors to adjust the voltage to be provided across the potentiometers as indicated by the reference characters $PM_1$ and $PM_2$, so that the cost of production of the exposure information setting circuit of the present invention is low compared with the conventional circuit, yet maintains the required accuracy.

Figure 2:
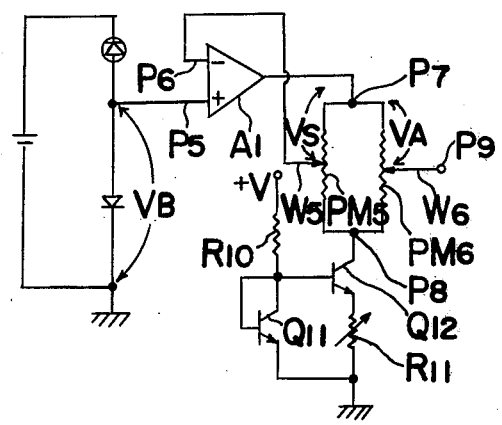

Note that the integrated circuit provided in the information setting circuit of the present invention is not limited to that shown in FIG. 3 or in FIGS. 5 to 9, but, for example, may be the constant current generator constituted by the transistors $Q_{11}$ and $Q_{12}$ and resistors $R_{10}$ and $R_{11}$, as shown in FIG. 2, in which the resistor $R_{11}$ is fixed. In this case, a resistor corresponding to the resistor $R_6$ of FIG. 3 is connected to the collector of the transistor $Q_{12}$. Since required ratios of the transistor areas and resistance of the resistors can be precisely achieved, an accurate output can be achieved by the reasons given above in reference to the circuit of FIG. 3. In a circuit thus employing the transistors $Q_{11}$ and $Q_{12}$ and resistors $R_{10}$ and $R_{11}$, however, it is necessary to provide an additional circuit for maintaining the power supply voltage at a constant value, since according to the equations given above, the factors of the power supply remain in the equations.

Although the present invention has been fully described by way of examples with reference to the attached drawings, that various changes and modifications are apparent to those skilled in the art. Therefore, unless such changes and modifications depart from the scope of the present invention, they should be construed as included therein.

What is claimed is:

1. An exposure information setting circuit for use in a photographic camera for calculating a required APEX exposure index in response to input signals indicative of the other APEX exposure indices and for producing an output signal indicative of the required APEX exposure index, said exposure information setting circuit including an integrated circuit for providing a constant voltage for performing the calculation of the required APEX exposure index, said integrated circuit comprising;
    (a) a first pair of transistors consisting of a first transistor and a second transistor, the bases of said first and second transistors being connected to each other;
    (b) a second pair of transistors consisting of a third transistor and a fourth transistor, the bases of said third and fourth transistors being connected to each other;
    (c) means for connecting the collector of said first transistor to the collector of said third transistor;
    (d) means for connecting the collector of said second transistor to the collector of said fourth transistor;
    (e) means for connecting the emitters of said first and second transistors through a first connecting point;
    (f) means for connecting the emitters of said third and fourth transistors through a second connecting point;
    (g) a resistor connected between said second connecting point and the emitter of one of said third and fourth transistors;

(h) means for providing said first pair of transistors with a base current in accordance with the voltage level at the connecting point between the collectors of said first and third transistors for providing negative feedback;

(i) means for providing said second pair of transistors with a base current in accordance with the voltage level at the connecting point between the collectors of said second and fourth transistors for providing negative feedback;

(j) means for supplying power between said first and second connecting points;

(k) an output transistor, the base-emitter voltage thereof being determined depending on the base-emitter voltage of one of the first, second, third and fourth transistors; and (l) an output resistor connected to the collector of the output transistor, the collector current of the output transistor flowing through the output resistor and the desired constant source voltage being obtainable from the output resistor.

2. An integrated circuit as claimed in claim 1, wherein the base of said output transistor is connected to the bases of transistors in either one of said first and second pairs of transistors, the emitter of said output transistor being connected to said connecting point of said either one of said first and second pairs of transistors.

3. An integrated circuit as claimed in claim 2 further comprising second and third resistors connected, respectively, between emitter of transistors in said first pair and said first connecting point.

4. An integrated circuit as claimed in claim 3, wherein said either one of said first and second pair is the second pair.

5. An integrated circuit as claimed in claim 4 further comprising a fourth resistor between said power supplying means and said second connecting point, the emitter of said output transistor being connected to said second connecting point through said fourth resistor.

6. An integrated circuit as claimed in claim 5 further comprising a fifth resistor connected to the emitter of said output transistor, the emitter of said output transistor connected to said second connecting point through said fourth and fifth resistors.

7. An exposure information setting circuit for use in a photographic camera for producing an output signal indicative of a required APEX exposure index, said exposure information setting circuit including an integrated circuit for providing a constant voltage, said integrated circuit comprising;

(a) a first pair of transistors consisting of a first transistor and a second transistor, the bases of said first and second transistors being connected to each other;

(b) a second pair of transistors consisting of a third transistor and a fourth transistor, the bases of said third and fourth transistors being connected to each other;

(c) first means for connecting the collector of said first transistor to the collector of said third transistor;

(d) second means for connecting the collector of said second transistor to the collector of said fourth transistor;

(e) means for connecting the emitters of said first and second transistors through a first connecting point;

(f) means for connecting the emitters of said third and fourth transistors through a second connecting point;

(g) a resistor connected between said second connecting point and the emitter of one of said third and fourth transistors;

(h) means for providing said first pair of transistors with a base current in accordance with the voltage level at the connecting point between the collector of said first and third transistors for providing negative feedback;

(i) means for providing said second pair of transistors with a base current in accordance with the voltage level at the connecting point between the collectors of said second and fourth transistors for providing negative feedback; and (j) means for supplying power between said first and second connecting points, one of said first and second connecting means including an output resistor, a predetermined constant source voltage being obtainable from said output resistor.

8. An exposure information setting circuit as claimed in claim 7, further comprising at least one potentiometer connected in parallel with said output resistor to receive the constant voltage therefrom, said potentiometer having at least a slider which is movable in accordance with at least one APEX exposure index.

9. An exposure information setting circuit as claimed in claim 1, further comprising a light measuring circuit for providing one of said input signals indicative of APEX exposure indices, said light measuring circuit including a photodiode for producing an output current in accordance with the received light intensity and a semiconductor means for converting the output current into a voltage proportional to the logarithm of the output current by means of a semiconductor P-N junction.

10. An exposure information setting circuit as claimed in claim 9, further comprising a potentiometer connected in parallel with said output resistor to receive the constant voltage therefrom for setting at least one APEX exposure index, whereby said semiconductor means determines one of said input signals indicative of APEX exposure indices and said potentiometer determines another of said input signals indicative of APEX exposure indices.

11. An exposure information setting circuit as claimed in claim 10, wherein the photographic camera includes an electromagnet, a capacitor, a switching circuit responsive to the voltage across said capacitor for controlling said electromagnet and a current controlling transistor, the collector of which is connected to said capacitor, the base of the current controlling transistor being responsive to said required APEX exposure index.

12. An exposure information setting circuit as claimed in claim 1, further comprising at least one potentiometer connected in parallel with said output resistor to receive the constant voltage therefrom, said potentiometer having at least a slider which is movable in accordance with at least one APEX exposure index.

13. An exposure information setting circuit for use in a photographic camera for calculating a required APEX exposure index in response to input signals indicative of the other APEX exposure indices and for producing an output signal indicative of the required APEX exposure index, said exposure information setting circuit including an integrated circuit for providing a constant voltage for performing the calculation of the required APEX exposure index, said integrated circuit comprising;

(a) a first pair of transistors consisting of a first transistor and a second transistor, the bases of said first and second transistors being connected to each other;

(b) a second pair of transistors consisting of a third transistor and a fourth transistor, the bases of said third and fourth transistors being connected to each other;

(c) means for connecting the collector of said first transistor to the collector of said third transistor;

(d) means for connecting the collector of said second transistor to the collector of said fourth transistor;

(e) means for connecting the emitters of said first and second transistors through a first connecting point;

(f) means for connecting the emitters of said third and fourth transistors through a second connecting point;

(g) a resistor connected between said second connecting point and the emitter of one of said third and fourth transistors;

(h) means for providing said first pair of transistors with a base current in accordance with the voltage level at the connecting point between the collector of said first and third transistors for providing negative feedback;

(i) means for providing said second pair of transistors with a base current in accordance with the voltage level at the connecting point between the collectors of said second and fourth transistors for providing negative feedback;

(j) means for supplying power between said first and second connecting points;

(k) a fifth transistor, the base-emitter voltage thereof being determined depending on the base-emitter voltage of one of said first, second, third and fourth transistors;

(l) a sixth transistor, the collector current thereof being determined depending on the collector current of said fifth transistor;

(m) a seventh transistor, the base-emitter voltage thereof being determined depending on the base-emitter voltage of said sixth transistor; and (n) an output resistor connected to the collector of said seventh transistor, the collector current of said seventh transistor flowing through the output resistor and the desired constant source voltage being obtainable from said output resistor.

14. An exposure information setting circuit as claimed in claim 13, further comprising at least one potentiometer connected in parallel with said output resistor to receive the constant voltage therefrom, said potentiometer having at least a slider which is movable in accordance with at least one APEX exposure index.

* * * * *